(12) United States Patent
Lenglet et al.

(10) Patent No.: US 7,070,742 B2
(45) Date of Patent: Jul. 4, 2006

(54) REACTOR FOR CHEMICAL CONVERSION OF A FEEDSTOCK IN THE PRESENCE OF A DILUENT, WITH HEAT INPUTS AND FEEDSTOCK/CATALYST CROSS-CIRCULATION

(75) Inventors: Eric Lenglet, Rueil Malmaison (FR); Nicolas Boudet, Lyons (FR); Frédéric Hoffmann, Sainte Foy les Lyon (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/432,774

(22) PCT Filed: Nov. 7, 2001

(86) PCT No.: PCT/FR01/03459

§ 371 (c)(1),
(2), (4) Date: Nov. 10, 2003

(87) PCT Pub. No.: WO02/43852

PCT Pub. Date: Jun. 6, 2002

(65) Prior Publication Data

US 2004/0071593 A1    Apr. 15, 2004

(30) Foreign Application Priority Data

Nov. 29, 2000   (FR) .................... 00 15424

(51) Int. Cl.
*B01J 8/08*  (2006.01)
*B01J 8/12*  (2006.01)
*F28D 13/00* (2006.01)
*F28D 21/00* (2006.01)

(52) U.S. Cl. ............... 422/146; 422/139; 422/145; 422/146; 422/198; 422/200

(58) Field of Classification Search ............ 422/139, 422/141, 142, 145, 146, 188, 189, 190, 191, 422/193, 196, 197, 198, 200
See application file for complete search history.

(56) References Cited

U.S. PATENT DOCUMENTS

| | | | |
|---|---|---|---|
| 2,534,859 A | 12/1950 | Evans | |
| 2,865,848 A | 12/1958 | Ramella | |
| 4,525,482 A | 6/1985 | Ohsaki et al. | |
| 5,525,311 A | * 6/1996 | Girod et al. | ............ 422/200 |

FOREIGN PATENT DOCUMENTS

FR    877663 A    1/1943

OTHER PUBLICATIONS

Patent Abstracts of Japan, vol. 007, No. 019 (C-147), (Jan. 25, 1983) & JP 57177330A Babcock Hitachi KK, (Jan. 11, 1982).

* cited by examiner

*Primary Examiner*—Alexa D. Neckel
(74) *Attorney, Agent, or Firm*—Millen, White, Zelano & Branigan, P.C.

(57) ABSTRACT

A reactor with integrated heat for carrying out a chemical conversion process in the presence of a gaseous diluent supplied through one or more ports at the upper and/or lower ends of a catalytic bed through which a feed moves substantially horizontally, and a process for converting a feed, such as a hydrocarbon feed in the reactor.

16 Claims, 3 Drawing Sheets

REACTOR FOR CHEMICAL CONVERSION OF A FEEDSTOCK IN THE PRESENCE OF A DILUENT, WITH HEAT INPUTS AND FEEDSTOCK/CATALYST CROSS-CIRCULATION

The chemical, petroleum and petrochemical industries employ many endothermic chemical reactions, for example cracking reactions, dehydrogenation reactions or hydrocarbon reforming reactions.

Certain of those reactions are reversible and limited by a thermodynamic equilibrium. In that case, the cooling occurring in the catalytic bed due to the endothermic nature of the reaction limits the reactant conversion.

One method for obtaining a high conversion consists of introducing heating surfaces into the catalytic bed, or using a plurality of catalytic beds separated by zones for re-heating the reaction fluid.

Frequently, a diluent is added to the feed to reduce its partial pressure and/or protect the catalyst. Diluents are generally selected from the group formed by steam, nitrogen, hydrogen and mixtures thereof.

In many cases, in particular for hydrocarbon dehydrogenation, the catalyst is at least partially deactivated during the reaction, for example by coking, and must be extracted, continuously or at distinct time intervals, and replaced by new or regenerated catalyst.

Processes such as catalytic hydrocarbon reforming are known in which the reaction feed successively traverses a plurality of catalytic bed reactors, with intermediate re-heating between the reactors to compensate for cooling of the reaction fluid due to the endothermic nature of the reaction. The catalyst flows from one reactor to another, as a co-current or as a counter-current to the feed plus hydrogen-rich diluent before being regenerated and recycled. The catalyst is used efficiently and homogeneously coked before being regenerated.

The invention concerns a reactor for chemical conversion of a feed, said chemical conversion reactor containing a substantially vertical catalytic bed between an upper end and a lower end for chemical conversion of a feed in the presence of a gaseous diluent, and comprising, in combination:

close to the upper end of said reactor, at least one means for introducing a solid catalyst;

means for introducing and evacuating said feed allowing its flow in a substantially horizontal manner through the catalytic bed;

in the proximity of the lower end of said reactor, at least one means for extracting catalyst;

at least one means for heating said feed plus added diluent, said means being internal to the reactor and traversed by said feed plus added diluent in the absence of catalyst, and separating the catalytic bed into a portion upstream of and a portion downstream of said heating means relative to the direction of flow of said feed;

said reactor comprising at least one means for introducing a stream of said gaseous diluent substantially in the proximity of at least one of the upper and/or lower ends of said upstream portion of the catalytic bed, to at least reduce by-passing of said heating means by said feed plus added diluent.

Preferably, the means for introducing a stream of gaseous diluent is selected from the group formed by means with a capacity sufficient to prevent any by-passing of the heating means.

Typically, the means for introducing gaseous diluent is located substantially in the proximity of the upper end of the upstream portion of the catalytic bed. It is also possible to introduce a stream of gaseous diluent in the proximity of the lower end of the upstream portion of the catalytic bed to reduce or prevent by-passing of the heating means at the bottom of the catalytic bed.

The invention also provides a process for chemical conversion of a feed using a reactor as described above.

In particular, the conversion process is applicable to a hydrocarbon feed.

More particularly, the process of the invention is a process for catalytic dehydrogenation of a paraffinic hydrocarbon feed.

The reactor can be a reactor-exchanger with heating surfaces immersed in the catalytic bed; it can also comprise a plurality of catalytic beds separated by non-catalytic zones for heating the reaction feed. In each of these zones, the reaction feed traverses a heat exchanger, supplied with a heat transfer fluid.

Heat transfer fluids that can be used include pressurised steam, for example between 0.5 MPa and 1.20 MPa, preferably between 0.6 MP and 1 MPa absolute, limits included, hydrogen or a hydrogen-containing gas such as a hydrogen-rich recycle gas, such as that used in certain processes to dilute the reaction feed to protect the catalyst. It is also possible to use the unconverted feed itself, or liquids such as molten salts or liquid sodium.

The differentiated catalyst extraction means is normally selected from the group formed by continuous and discontinuous extraction means.

Preferably, the catalytic bed comprises a plurality of catalytic zones separated by non-catalytic zones for heating the feed.

In a preferred feature of the invention, the most upstream catalyst extraction means differs from the furthest downstream extraction means in its lower extraction capacity (the concepts of upstream and downstream being with respect to the direction of flow of the feed).

The invention also proposes a process for chemical conversion of a feed using a reactor as described above.

Typically, the feed is a hydrocarbon feed, often with an added diluent (for example steam, hydrogen, nitrogen or a mixture of these gases).

In a particular implementation of the invention, the chemical conversion process is a process for catalytic dehydrogenation of a paraffinic hydrocarbon feed.

Figure 1:
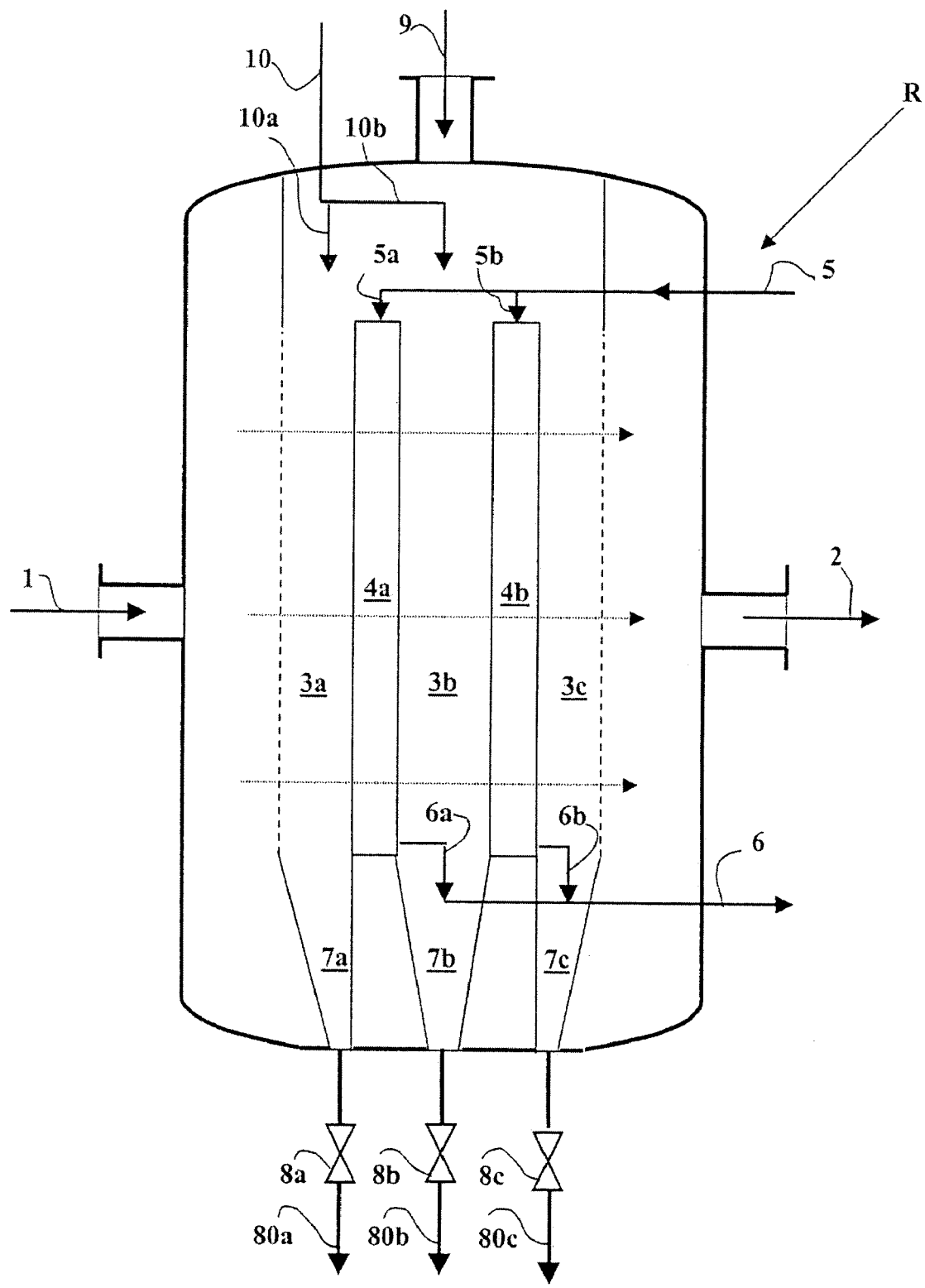
FIG. 1: Illustrates a reactor in accordance with the invention with means for introducing diluent in an upper end and a lower end of the reactor.

We shall now refer to FIG. 1, which is a non-limiting representation of a reactor R in accordance with the process of the invention.

The reaction feed is introduced into reactor R via a line 1; it traverses, in succession, a catalytic bed 3a, then a heat exchanger 4a, then a second catalytic bed 3b, then a second heat exchanger 4b, then a third and last catalytic bed 3c, before leaving the reactor via a line 2. The catalyst is introduced into the reactor at the head thereof via a line 9. It is distributed into the three catalytic beds 3a, 3b, 3c in which they flow under gravity in downflow mode. Each catalytic bed has a separate hopper for evacuating the catalyst: 7a for bed 3a, 7b for bed 3b and 7c for bed 3c.

Extraction valves 8a, 8b, 8c at the bottom of each of the catalytic beds can separately extract used catalyst flowing in each of the catalytic beds in series. The catalyst is evacuated via lines 80a, 80b and 80c.

Figure 2:
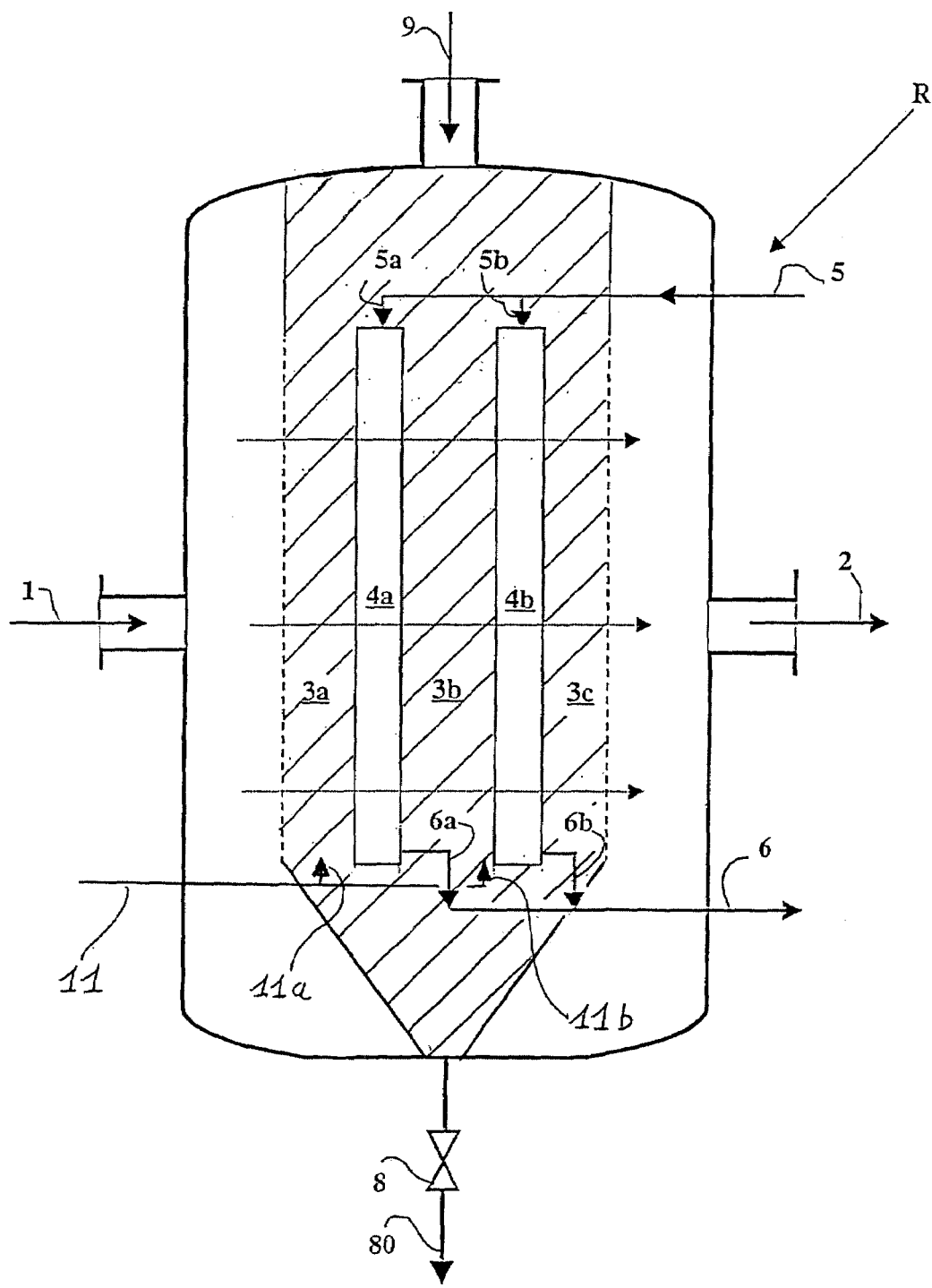
FIG. 2: Illustrates a reactor in accordance with the invention with means for introducing diluent in a lower end of the reactor.
Figure 3:
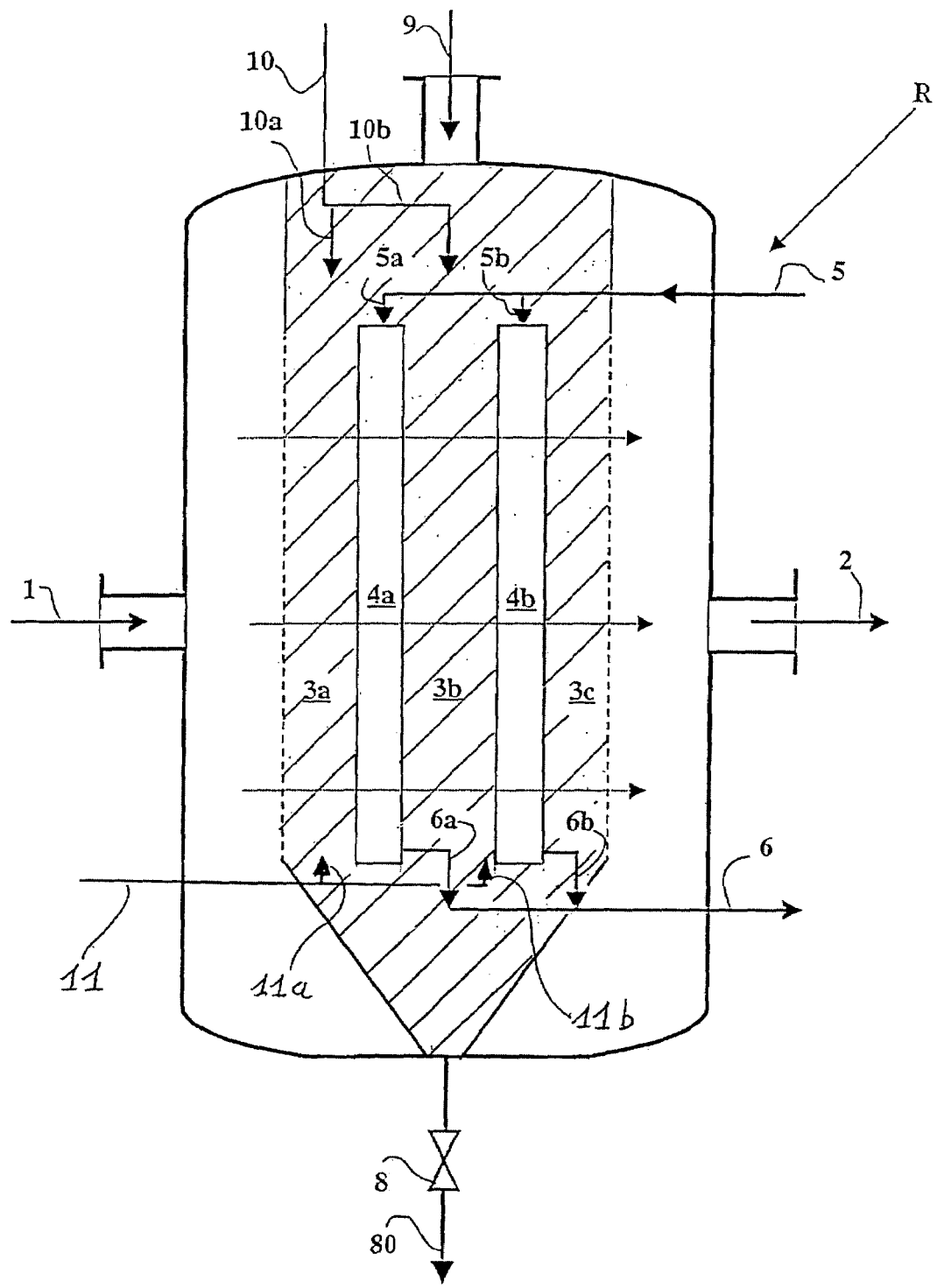
FIG. 3: Illustrates a reactor in accordance with the invention with means for introducing diluent in an upper end and a lower end of the reactor.

In a single catalyst bed reactor, extraction valves 8a–c are replaced with a single extraction valve 8 and lines 80a–c are replaced with single line 80 as can be seen on FIGS. 2 and 3.

Heat exchangers 4a and 4b are fed by heat transfer fluid introduced via lines 5, 5a and 5b, this fluid leaving the exchanger via lines 6a, 6b and 6.

At the upper portion of beds 3a and 3b, flow of gaseous diluent is introduced via lines 10, 10a and 10b. The function of this gas is to provide a barrier gas to prevent feed passing from bed 3a to bed 3b and by-passing exchanger 4a, and similarly preventing feed passing from bed 3b to bed 3c and by-passing exchanger 4b. By-pass is highly deleterious to the overall conversion of the feed as the portion of feed that by-passes the heating means is only slightly converted.

At a lower portion of the bed(s), flow of gaseous diluent is introduced via lines 11, 11a and 11b as can be seen in FIGS. 2 and 3.

Typically, this gas can be a diluent for the feed, for example steam or a hydrogen-rich recycle gas.

The unit functions as follows.

The feed, pre-heated to the reaction temperature, traverses the three catalytic beds (or zones) 3a, 3b, 3c in series, with two intermediate re-heating steps.

The catalyst, introduced via line 9, is extracted continuously or discontinuously via lines 80a, 80b, 80c.

In the reactor, in accordance with the invention, the catalyst flowing in bed 3c is preferably renewed more rapidly than that in bed 3a. Typically, the catalyst ages more rapidly and deactivates and cokes more rapidly at the end of the reaction zone, i.e., in the downstream bed 3c more than in the upstream bed 3a. Preferably, 3c is renewed more rapidly than 3b, which is itself renewed more rapidly than bed 3a.

The invention thus enables the catalyst to be used efficiently, which catalyst is extracted in a relatively constant state of deactivation.

When operation is continuous, valves 8a, 8b, 8c can be used to adjust the differentiated catalyst extraction.

When operation is discontinuous, varying quantities of catalyst can be extracted at intervals depending on the catalytic zones (higher extraction rates in the downstream zones in the direction of feed flow).

It is also possible to carry out more frequent catalyst extraction in the downstream zone 3c than in zone 3b and/or in zone 3b than in zone 3a. It is also possible to modulate the frequency and quantities of catalyst extracted.

Finally, it is possible to carry out limited extraction of the used catalyst (for example 10% to 33% by volume of each bed) or to renew the entire volume of an individual bed (or zone): 3a, 3b or 3c. In this case, the catalyst in zone 3c is preferably renewed more frequently than that in zone 3a.

The reactors of the invention can contain 2 to about 20 catalytic zones separated by heat exchange zones.

The reaction fluid can also be introduced laterally and flow horizontally, as a crosswise current to the feed.

It is possible to use thin beds, for example 5 to 10 cm thick, or of medium thickness, for example between 10 and 80 cm, and if the process demands it, low or high space velocities (for example 10 to 250 $h^{-1}$). The temperatures depend on the process but are frequently in the range 250° C. to 950° C., preferably between about 400° C. and about 700° C. These values do not limit the invention.

The scope of the invention also encompasses the case wherein there is but a single catalytic bed, or beds in parallel, with a crosswise feed/catalyst flow.

The reactor of the invention can carry out chemical conversion of a feed in the presence of a catalyst while providing each of the catalytic zones with the necessary amount of heat. It also enables the at least partially deactivated catalyst to be extracted in a differentiated manner.

The reactor of the invention can maintain a high catalytic activity and/or productivity for the desired product.

The invention can in particular be employed for hydrocarbon reforming, for dehydrogenating ethylbenzene, and for dehydrogenating paraffins such as propane, n-butane, isobutane, primarily linear paraffins containing 10 to 14 carbon atoms, and for the production of olefins for the production of alkylbenzenes, or for other chemical reactions.

The invention claimed is:

1. A reactor for chemical conversion in the presence of a gaseous diluent, containing a substantially vertical catalytic bed between an upper end and a lower end and comprising, in combination:
    close to the upper end of said reactor, at least one means for introducing a solid catalyst;
    means for introducing and evacuating said feed allowing its flow in a substantially horizontal manner through the catalytic bed;
    in the proximity of the lower end of said reactor, at least one means for extracting catalyst;
    at least one means for heating said feed plus added diluent, said means being internal to the reactor and traversed by said feed plus added diluent in the absence of catalyst, and separating the catalytic bed into an upstream portion and a portion downstream of said heating means relative to the direction of flow of said feed;
        wherein the reactor comprises at least one means for introducing a stream of said gaseous diluent substantially in the proximity of at least one of the upper and/or lower ends of said upstream portion of the catalytic bed, to at least reduce by-passing of said heating means by said feed plus added diluent.

2. A reactor according to claim 1, in which the means for introducing a stream of gaseous diluent is selected from the group formed by means with a capacity sufficient to prevent by-passing of the heating means.

3. A reactor according to claim 1, in which the means for introducing gaseous diluent is located substantially in the proximity of the upper end of the upstream portion of the catalytic bed.

4. A reactor according to claim 1, wherein the gaseous diluent is introduced substantially in the proximity of the upper and lower ends of the upstream portion of the catalytic bed.

5. A reactor according to claim 1, wherein the gaseous diluent is introduced substantially in the proximity of the upper end of the upstream portion of the catalytic bed.

6. A reactor according to claim 1, wherein the gaseous diluent is introduced substantially in the proximity of the lower end of the upstream portion of the catalytic bed.

7. A reactor according to claim 1, wherein the catalytic bed is separated into upstream and downstream portions with respect to direction of flow of the feed by separators or the catalytic bed has separate hoppers for said upstream and downstream portions.

8. A reactor according to claim 5, wherein the catalytic bed is separated into upstream and downstream portions with respect to direction of flow of the feed by separators or the catalytic bed has separate hoppers for said upstream and downstream portions.

9. A reactor according to claim 1, wherein the catalytic bed is a single catalytic bed which is separated by zones for heating into at least an upstream and downstream portions with respect to direction of flow of the feed.

10. A reactor according to claim 4, wherein the catalytic bed is a single catalytic bed which is separated by zones for heating into at least an upstream and downstream portions with respect to direction of flow of the feed.

11. A reactor according to claim 6, wherein the catalytic bed is a single catalytic bed which is separated by zones for heating into at least an upstream and downstream portions with respect to direction of flow of the feed.

12. A reactor according to claim 7, wherein a separate catalyst extraction port is provided for each of separated upstream and downstream portions of the catalytic bed.

13. A reactor according to claim 1, wherein the means for introducing the feed and the diluent are separate from each other.

14. A reactor for chemical conversion in the presence of a gaseous diluent, containing a substantially vertical catalytic bed between an upper end and a lower end and comprising
  close to the upper end of the reactor a solid catalyst introduction port,
  a feed introduction into the reactor and a feed removal port configured to allow feed flow in a substantially horizontal manner through the catalytic bed,
  in the proximity of the lower end of the reactor, a catalyst extraction port,
  a catalytic bed heating element which is internal to the reactor and which is traversed by feed and which separates the catalytic bed into an upstream portion and a portion downstream of said heating means relative to the direction of flow of said feed,
  and at least one gaseous diluent stream introduction port, substantially in the proximity of at least one of the upper and/or lower ends of said upstream portion of the catalytic bed, capable of reducing by-passing of the heating element by the feed plus diluent.

15. A reactor according to claim 14, wherein the feed introduction and diluent stream introduction ports are separate from each other.

16. A reactor according to claim 14, wherein the at least one gaseous diluent stream introduction port is substantially in the proximity of the upper end of said upstream portion of the catalytic bed.

* * * * *